United States Patent [19]

Waggoner

[11] Patent Number: 5,495,656

[45] Date of Patent: Mar. 5, 1996

[54] METHOD OF MAKING BLANKS AND CLAD PARTS

[75] Inventor: John P. Waggoner, Decatur, Ind.

[73] Assignee: Amcast Industrial Corporation, Dayton, Ohio

[21] Appl. No.: 396,871

[22] Filed: Mar. 1, 1995

Related U.S. Application Data

[63] Continuation of Ser. No. 144,142, Oct. 27, 1993, abandoned, which is a continuation-in-part of Ser. No. 110,069, Aug. 19, 1993, abandoned.

[51] Int. Cl.$^6$ .................................................. B23P 17/00
[52] U.S. Cl. .................. 29/417; 29/523; 29/527.5; 29/527.6; 228/254; 228/255
[58] Field of Search ...................... 29/417, 469.5, 29/890.053, 523, 527.5–527.7; 228/183, 253–255; 72/255, 258, 352, 358, 368, 700

[56] References Cited

U.S. PATENT DOCUMENTS

| | | | |
|---|---|---|---|
| 2,961,762 | 11/1960 | Clark et al. | 228/117 X |
| 3,287,949 | 11/1966 | Skinner | 228/255 X |
| 3,970,237 | 7/1976 | Dockus . | |
| 3,985,283 | 10/1976 | Gempler . | |
| 4,048,703 | 9/1977 | Lehnhart | 29/898.057 |
| 4,143,802 | 3/1979 | Winterbottom . | |
| 4,146,164 | 3/1979 | Anderson et al. . | |
| 4,367,838 | 1/1983 | Yoshida | 72/258 X |
| 4,575,343 | 3/1986 | Kin et al. | 72/258 X |
| 4,688,311 | 8/1987 | Saperstein et al. . | |
| 4,738,011 | 4/1988 | Mori | 72/700 X |
| 4,805,693 | 2/1989 | Flessate . | |
| 4,881,312 | 11/1989 | Dalo . | |
| 4,903,389 | 2/1990 | Wolf . | |
| 4,917,180 | 4/1990 | Wolf et al. . | |
| 4,988,036 | 1/1991 | Komble et al. . | |
| 5,042,574 | 8/1991 | Coltone et al. . | |
| 5,103,547 | 4/1992 | Holloway et al. | 29/451 |
| 5,105,540 | 4/1992 | Rhodes . | |
| 5,176,205 | 1/1993 | Anthony . | |
| 5,180,098 | 1/1993 | Halstead et al. . | |
| 5,274,921 | 1/1994 | Kawagoe et al. | 29/898.059 |
| 5,275,970 | 1/1994 | Itoh et al. | 228/254 X |
| 5,288,356 | 2/1994 | Benefiel | 29/469.5 X |

FOREIGN PATENT DOCUMENTS

| | | | |
|---|---|---|---|
| 320835 | 5/1957 | France | 228/255 |
| 2-192813 | 7/1990 | Japan | 72/258 |
| 3-32418 | 2/1991 | Japan | 72/258 |
| 3-138017 | 6/1991 | Japan | 72/258 |
| 2074917 | 11/1981 | United Kingdom | 72/258 |

*Primary Examiner*—S. Thomas Hughes
*Attorney, Agent, or Firm*—Killworth, Gottman, Hagan & Schaeff

[57] ABSTRACT

A composite blank is formed from an aluminum base blank and an aluminum brazing alloy clad material which is affixed to the base blank. Alternately, a multielement blank is formed by at least one base preform and at least one separate clad preform. The composite and multielement blanks are forged into required parts such that as the required parts are formed, the clad material forms an integral coating on the finished part in one or more positions which are to be clad. The composite blank may be formed by initially forming a base blank having one or more recesses on its surface into which clad material is inserted. Recesses can be formed in base blanks as slots during extrusion of the base blanks in a continuous form or otherwise. Clad material is then inserted into each slot on the continuous form with composite blanks being formed by cutting the resulting continuous form. Alternately, clad material can be extruded into each slot or the base blank and clad material can be co-extruded to fill each slot with clad material. A composite blank can also be formed by covering one or more continuous portions of the outer surface of a base blank with clad material.

9 Claims, 6 Drawing Sheets

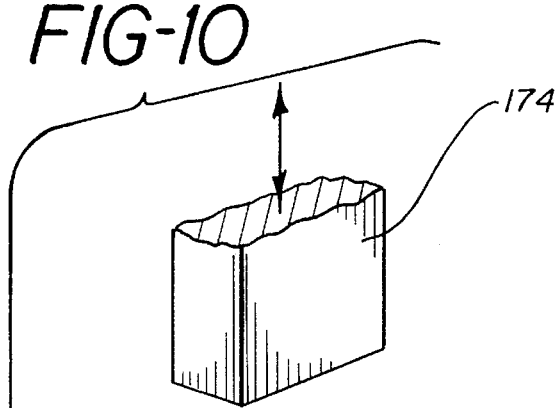
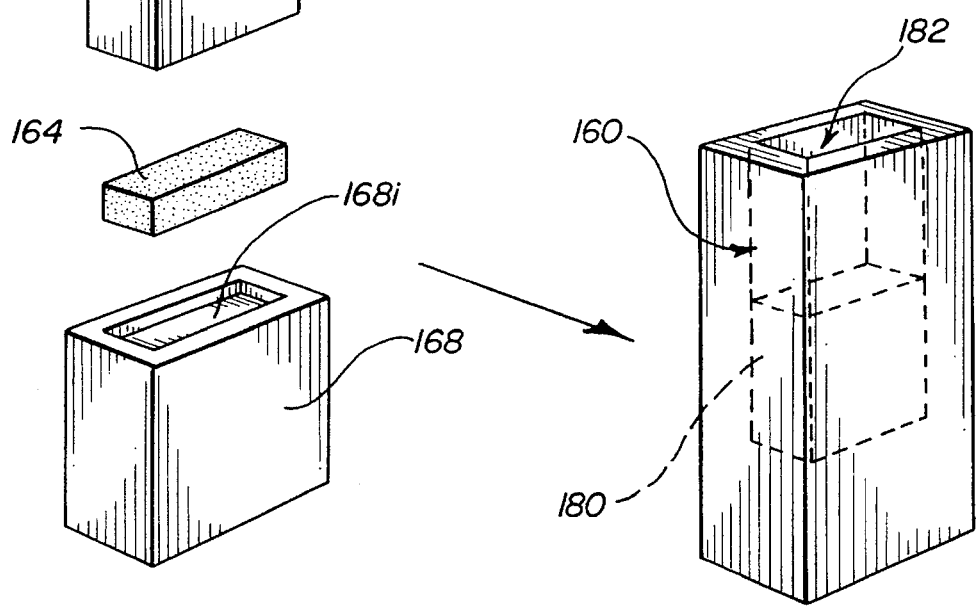
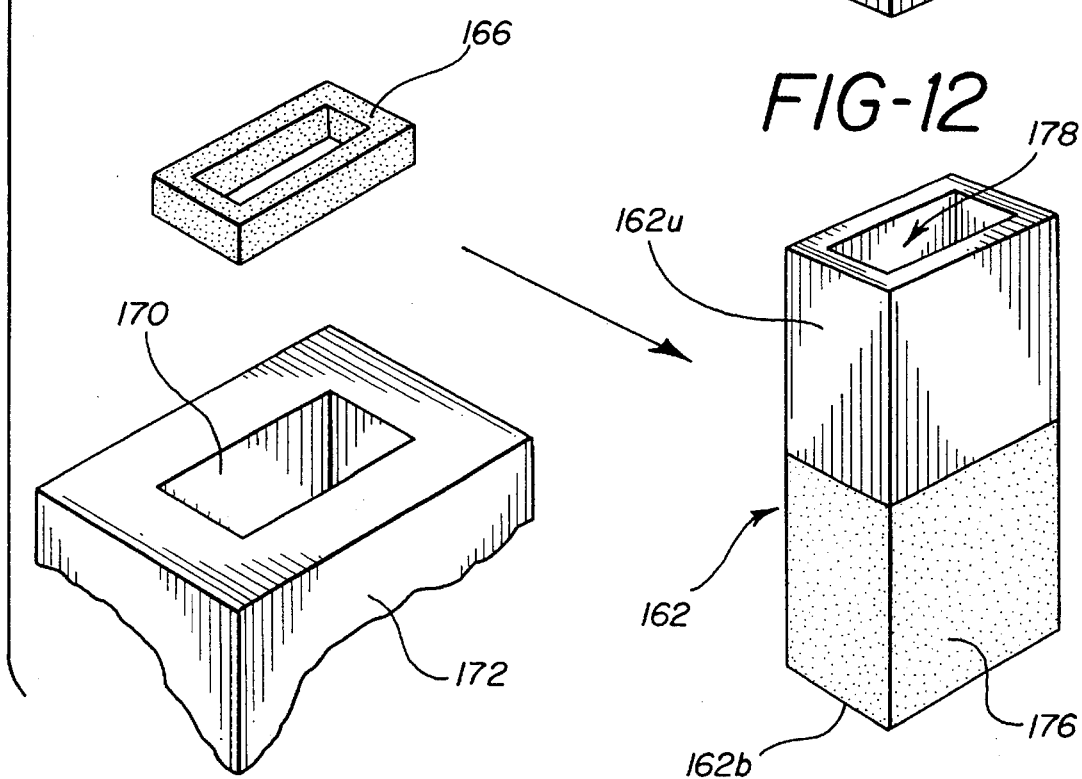

METHOD OF MAKING BLANKS AND CLAD PARTS

This application is a continuation of application Ser. No. 08/144,142, filed Oct. 27, 1993 and now abandoned, which is a continuation-in-part of application Ser. No. 08/110,069, filed Aug. 19, 1993 now abandoned.

BACKGROUND OF THE INVENTION

The present invention relates in general to the preparation of brazeable metals for brazing and, more particularly, to the application of a brazing alloy to a part to be brazed during the formation of the part, for example by formation of a multielement blank or a composite blank including a parent metal and a braze alloy with the part then being formed from the multielement blank or the composite blank.

Brazing alloy will be used herein to refer to materials used to braze or solder one metallic part to another. Conventionally, a brazing alloy is clad or permanently applied by mechanical or chemical processes to surfaces of parts which are to be joined to other parts to form an assembly. Once assembled, the parts are heated to a temperature which melts the brazing alloy to fuse the assembly.

Parts can be preformed and then brazing alloy clad to the parts. More commonly, brazing sheet is formed by cladding a sheet of brazing alloy to a base sheet of a parent metal. The brazing sheet is then used to form clad parts.

Unfortunately, cladding preformed parts requires special cladding baths or other apparatus which can add substantially to production time and expense. Forming parts from clad brazing sheet also has disadvantages. For example, the parts which can be formed from clad brazing sheet are limited since many parts cannot be formed to required shapes while keeping the clad surface complete and properly located to be joined to mating parts.

Accordingly, there is a need for new techniques to fabricate clad parts quickly and inexpensively to supplement current fabrication techniques.

SUMMARY OF THE INVENTION

This need is met by the methods and apparatus of the present invention wherein clad material is formed onto a part during formation of the part. In one embodiment of the invention, a composite blank is initially formed from a parent metal, such as aluminum, and clad material, such as an aluminum brazing alloy. The composite blank is then used to form the required part. The clad material is positioned on the composite blank such that it forms an integral coating of the clad material on the parent metal in the proper location on the finished part. Using composite blanks of the present invention permits clad parts to be quickly and inexpensively produced which could not be so produced using conventional methods.

In another embodiment of the present invention, a multielement blank is utilized. The multielement blank is made up of at least one blank preform formed from a base material and having a defined size and shape, and at least one clad preform formed from clad material and having a defined size and shape corresponding to the blank preform. In the illustrated embodiment, a multielement preform comprises a two-part blank having one blank preform and one clad preform. The blank preform(s) and clad preform(s) are then inserted into a die which is operated, for example by forcing a punch thereinto, such that the clad material forms an integral coating on at least one portion of a surface of a clad part formed by forging the clad part from the multielement blank.

In addition to composite and multielement blanks and use of such blanks to form clad parts, the present invention encompasses methods for forming composite blanks. For example, a base blank is initially formed from a parent metal with clad material being inserted into one or more recesses on the base blank to form a composite blank which can be formed into a clad part. Recesses can be formed in base blanks as slots during extrusion of the base blanks in a continuous form or otherwise. Clad material is then inserted into each slot on the continuous form with composite blanks then being formed by cutting the continuous form. Alternately, clad material can be extruded into each slot or the base blank and clad material can be co-extruded to fill each slot with clad material.

Alternately, a composite blank can be formed by covering one or more continuous portions of the outer surface of a base blank with clad material. For example, solid or hollow generally cylindrical base blanks can be covered with clad material which partially or totally surrounds cylindrical sections of the base blanks to form composite blanks which can then be used to form sections of clad tubing or tubing having clad cylindrical rings thereon.

In accordance with one aspect of the present invention, a method for making a clad part comprises the steps of: forming a blank having clad material affixed to form at least one portion of an outer surface of the blank; and, forging the clad part from the blank to form an integral coating of the clad material on at least one portion of the outer surface of the clad part.

In one embodiment, the step of forming a blank having clad material affixed to at least one portion of an outer surface of the blank comprises the steps of: forming a blank having a recess therein; forming clad material into a preform sized to be received within the recess; and, inserting the preform into the recess in the blank. In turn, the step of forming a blank having clad material affixed to at least one portion of an outer surface of the blank may comprise the steps of: forming a continuous strip of blank material having at least one slot extending into an outer surface of the strip; forming clad material into strips sized to be received into the at least one slot of the continuous strip of blank material; forcing one of the strips of clad material into each of the at least one slot of the continuous strip of blank material to form a composite strip; and, cutting the blank from the composite strip.

In another embodiment, the step of forming a blank having clad material affixed to at least one portion of an outer surface of the blank comprises the steps of: extruding a continuous strip of blank material having at least one slot extending into an outer surface of the strip; extruding a strip of clad material into each of the at least one slot to form a composite strip; and, cutting the blank from the composite strip.

In still another embodiment, the step of forming a blank having clad material affixed to at least one portion of an outer surface of the blank comprises the steps of: forming clad material into a tubular form; forming a cylinder of blank material sized to be frictionally received within the tubular form of clad material; and, inserting the cylinder of blank material into the tubular form of clad material.

In yet another embodiment, the step of forming a blank having clad material affixed to at least one portion of an outer surface of the blank comprises the steps of: forming clad material into a tubular form; forming a tubular blank sized to be received within the tubular form; and, fixing the cylinder of blank material within the tubular form.

In an initial application of the present invention, the blank is formed of aluminum and the clad is an aluminum brazing alloy.

In accordance with another aspect of the present invention, a method of making a blank from which a clad part is formed comprises the steps of: forming a base blank having a defined size and shape; and, affixing clad material to the base blank to form at least one portion of an outer surface of the blank. The method may further comprise the step of forming at least one recess in an outer surface of the base blank; and, the step of affixing clad material to the base blank to form at least one portion of an outer surface of the blank comprises the steps of: forming clad material into a preform sized to be received within the at least one recess; and, inserting a preform into each of the at least one recess in the base blank.

In accordance with still another aspect of the present invention, a method of making a blank from which a clad part is formed comprises the steps of: forming a base blank having a defined size and shape with at least one recess in an outer surface of the base blank; forming clad material into a preform sized to be received within the at least one recess; and, inserting a preform into each of the at least one recess in the base blank.

In one embodiment, the step of forming a base blank comprises extruding blank material to have at least one slot extending into an outer surface of a resulting extrusion, the at least one slot defining the at least one recess. For this embodiment, the step of forming clad material into a preform may comprise the step of extruding at least one strip of clad material sized to be received within the at least one slot.

A method of making a blank from which a clad part is formed as claimed in claim wherein the step of inserting a preform into each of the at least one recess in the base blank comprises the step of co-extruding the blank material and the clad material such that the clad material is extruded into the at least one slot. The step of inserting a preform into each of the at least one recess in the base blank may comprise pressing a strip of clad material into each of the at least one slot. Alternately, the step of inserting a preform into each of the at least one recess in the base blank comprises the step of rolling a strip of clad material into each of the at least one slot.

In the noted initial application, the base blank is formed of aluminum and the clad material is an aluminum brazing alloy.

In accordance with yet another aspect of the present invention, a blank from which a clad part is formed comprises a base blank having a defined size and shape with clad material affixed to form at least one portion of an outer surface of the blank. The base blank may comprise at least one recess in an outer surface thereof with the clad material being received within each of the at least one recess. Preferably, the at least one recess comprises at least one slot formed into the base blank, and the clad material comprises at least one strip of clad material. In the noted initial application, the base blank is formed of aluminum and the clad material comprises an aluminum brazing alloy.

In accordance with yet still another aspect of the present invention, a method for making a clad part comprises the steps of inserting clad material and base material into a die, and operating the die to form a clad part from the base material and clad material by integrally coating the clad material on at least one portion of a surface of the clad part as the clad part is formed. In the forming methods of the present invention, the die may be operated such as by closing two or more parts of the die to form a clad part or the step of operating the die may comprise the step of forcing at least one punch into the die. The method may further comprise the steps of forming the clad material into a preform corresponding to the clad part to be made, and forming the base material into a blank corresponding to the clad part to be made.

In accordance with a final aspect of the present invention, a multielement blank from which a clad part is formed comprises at least one blank preform formed from a base material and having a defined size and shape, and at least one clad preform formed from clad material and having a defined size and shape corresponding to the blank preform such that the clad material forms an integral coating on at least one portion of a surface of a clad part formed by forging the clad part from the two-part blank.

It is thus an object of the present invention to provide an improved method and apparatus for quickly and inexpensively producing clad parts; to provide an improved method and apparatus for quickly and inexpensively producing clad parts by means of a composite blank from which the clad parts are formed; to provide an improved method and apparatus for quickly and inexpensively producing clad parts by means of a two-part blank from which the clad parts are formed; to provide an improved method and apparatus for quickly and inexpensively producing clad parts which are formed from a novel composite blank formed by combining a base blank of a parent material and clad material which is affixed to said base blank to form at least one portion of an outer surface of the composite blank; and, to provide an improved method and apparatus for quickly and inexpensively producing clad parts which are formed from a novel multielement blank including at least one blank preform of a parent material and at least one clad preform of a clad material which are inserted into a die which is thereafter operated to form a clad part having at least one portion of a surface thereof integrally coated with clad material.

Other objects and advantages of the invention will be apparent from the following description, the accompanying drawings and the appended claims.

BRIEF DESCRIPTION OF THE DRAWINGS

FIG. 10 schematically shows formation of generic clad parts from two-part multielement blanks in accordance with the present invention;

FIGS. 11 and 12 are perspective views of generic parts formed from the two-part multielement blanks of FIG. 10;

DETAILED DESCRIPTION OF THE INVENTION

Figure 1:
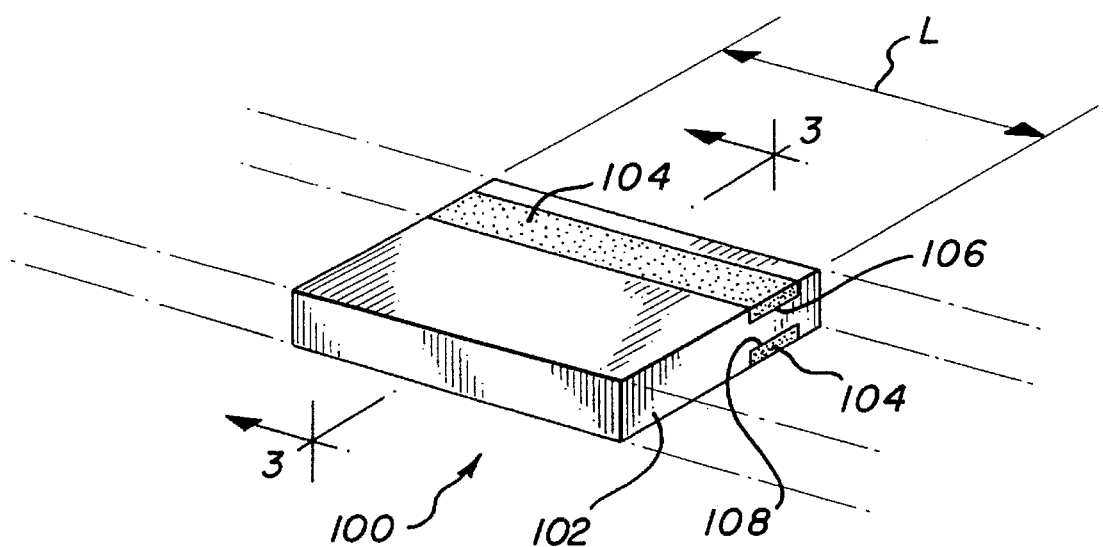
FIG. 1 is a perspective view of a first exemplary composite blank in accordance with the present invention.

The present invention will now be described with reference to the drawing figures. While the present invention is generally applicable to the formation of a wide variety of clad parts, as will become apparent, a first embodiment will be described with reference to the clad part of FIG. 2 which is formed from a composite blank 100 of FIG. 1.

The composite blank 100 is made up of a base blank 102 formed from a parent material to which clad material 104 is affixed to form at least one portion of the outer surface of the composite blank 100. For the composite blank 100, the clad material 104 forms two portions or strips of its outer surface. In the application of the illustrated embodiment of FIGS. 1 and 2, the parent material is aluminum and the clad material 104 is an aluminum brazing alloy.

Figure 7:
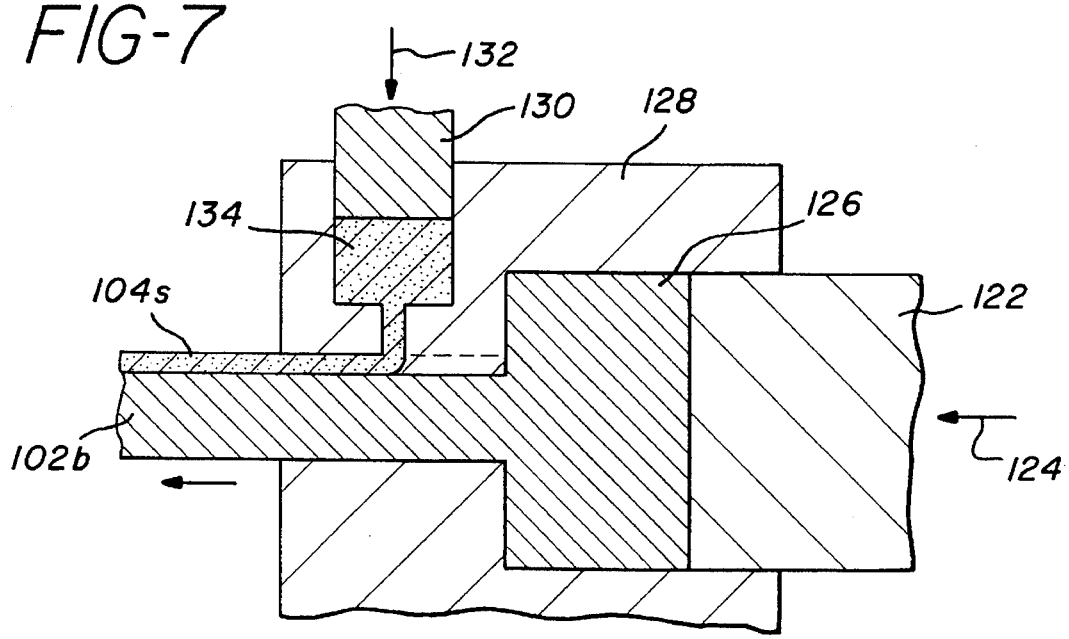

The base blank 102 can be formed in any manner; however, it is presently preferred to extrude the base blank 102 into a continuous form as indicated by the phantom lines of FIG. 1. Extrusion of the base blank 102 is illustrated in FIG. 7 which shows co-extrusion of the base blank 102 and the clad material 104 as will be described with reference to FIG. 7. In any event, the base blank 102 is formed to have at least one recess in its outer surface. In FIG. 1, two recesses are formed into the base blank 102, a first recess 106 in the top of the blank and a second recess 108 in the bottom of the blank.

Figure 5:
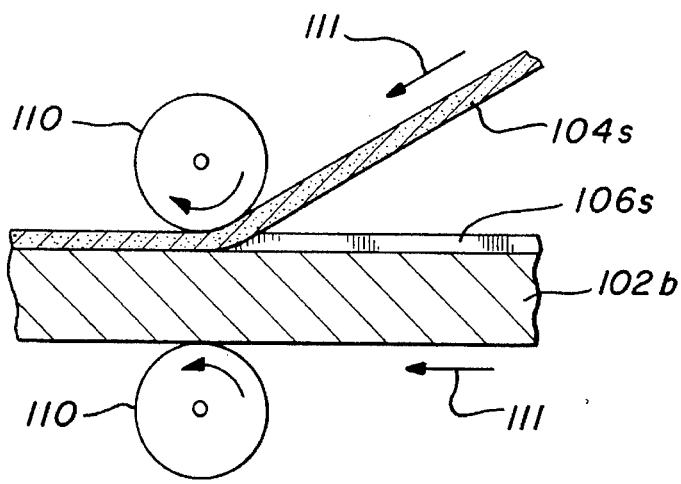
FIGS. 5–7 schematically illustrate formation of composite blanks in accordance with the present invention.

To complete the composite blank 100, clad material 104 is formed into a preform sized to be received within the recesses 106, 108. In the illustrated embodiment of FIG. 1, the clad material 104 is formed into a strip 104s, one of which is shown in FIG. 5. The strip 104s of clad material 104 is then pressed or rolled into the recesses 106, 108. As shown in FIG. 5, a continuous run of the strip 104s is pressed into a single recess or slot 106s formed into an upper surface of a base blank 102b as the base blank 102b and the strip 104s advance through rollers 110 as indicated by the arrows 111. The resulting continuous composite blank strip is then cut to a required length for a given application, for example, the length L for the composite blank 100 of FIG. 1.

Figure 6:
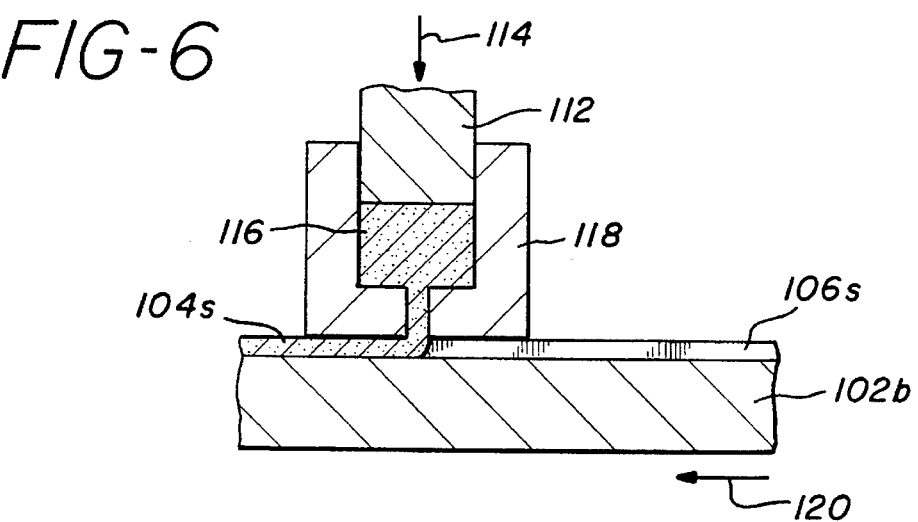

As shown schematically in FIG. 6, the strip 104s of clad material 104 can also be extruded into the slot 106s of the base blank 102b by means of a ram 112. The ram 112 moves in the direction of the arrow 114 to extrude a billet 116 of cladding material from a die/extruder 118 into the preformed slot 106s of the base blank 102b as the base blank 102b moves in the direction of the arrow 120 in synchronism with the ram 112.

The base blank 102b and the strip 104s of clad material 104 can also be co-extruded as shown schematically in FIG. 7. In FIG. 7, a first ram 122 moves in the direction of an arrow 124 to extrude a billet 126 of parent material, such as aluminum, from a die/extruder 128 to form the base blank 102b. A second ram 130 moves in the direction of the arrow 132 to extrude a billet 134 of cladding material, such as an aluminum brazing alloy, from the die/extruder 128 into the slot 106s of the base blank 102b as the base blank 102b is being extruded.

Figure 8:
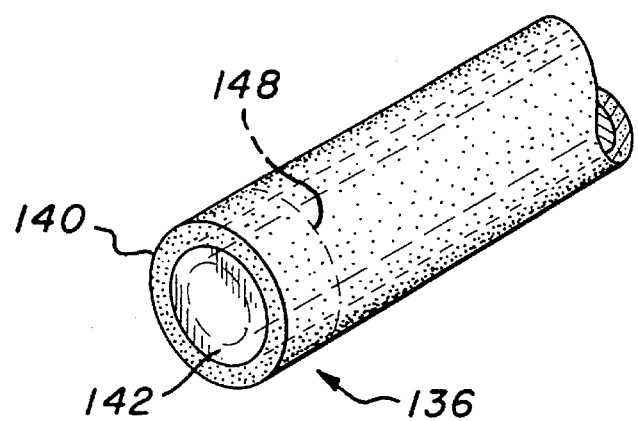
FIG. 8 is a perspective view of a section of a second exemplary composite blank in accordance with the present invention.

Other methods of forming composite blanks and other composite blank forms in accordance with the present invention will be apparent to those skilled in the art in view of the teachings of the present application. For example, a composite blank 136 as shown in FIG. 8 can be used to form a section of clad tubing 138 as shown in FIG. 9.

The composite blank 136 comprises a tubular section 140 of clad material 104 and a cylinder 142 of blank material sized to be received within the tubular section 140. The composite blank 140 is formed by fixedly inserting the cylinder 142 into the tubular section 140. The cylinder 142 and the tubular section 140 are fixedly secured to one another by friction or otherwise.

Figure 9:
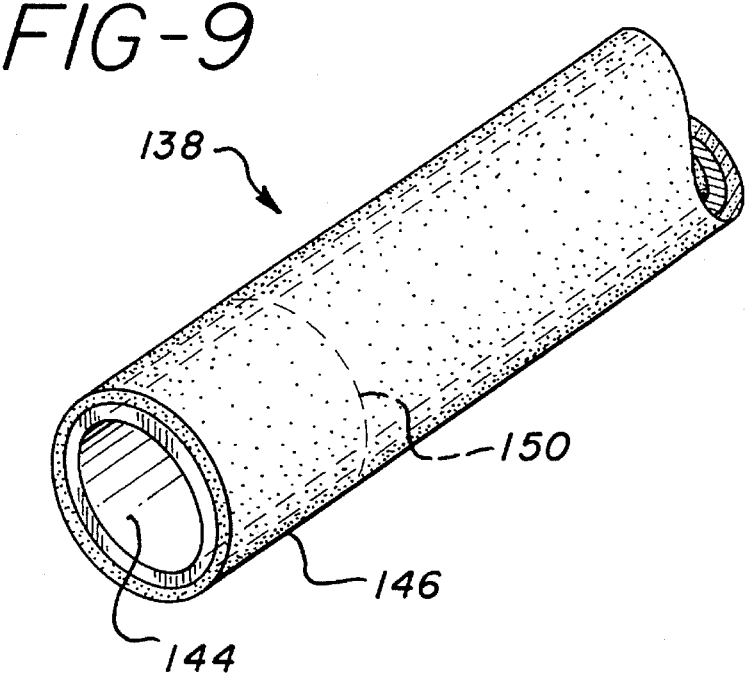
FIG. 9 is a perspective view of a section of clad tubing formed from the composite blank of FIG. 8.

The composite blank 140 is then forged or extruded to become the section of clad tubing 138 shown in FIG. 9 wherein a tube 144 is clad with a thin layer 146 of the cladding material 104. As shown by the dash-dot lines in FIG. 8, the cylinder 142 can be tubular to assist in forming the section of clad tubing 138 or determining the thickness of the tube 144.

It should also be apparent that the tubular section 140 of cladding material does not have to completely cover the outer cylindrical surface of the cylinder 142 but can be limited to only portions of the cylindrical surface of the cylinder 142. This is indicated by the dotted lines 148, 150 of FIGS. 8 and 9, respectively. Such partial cladding could be used, for example, to braze one or both ends of the section of clad tubing 138. Where only portions of the cylindrical surface of the cylinder 142 are covered, it is presently preferred to form annular recesses to receive the clad material, although such recesses are not necessary.

The formation of clad parts using composite blanks will now be described with reference to FIGS. 1–4. As shown schematically in FIG. 3, one composite blank 100 is placed into a receiving cavity of a die 152 and supported upon an ejector 154 which is maintained in its retracted position shown in FIGS. 3 and 4. A forming punch 156 is then forced into the cavity of the die 152 to forge or extrude the composite blank 100 into a manifold fitting 158 shown in perspective view in FIG. 2. The punch 156 is then withdrawn from the cavity of the die 152 and the fitting 158 is ejected from the cavity by operation of the ejector 154.

Figure 2:
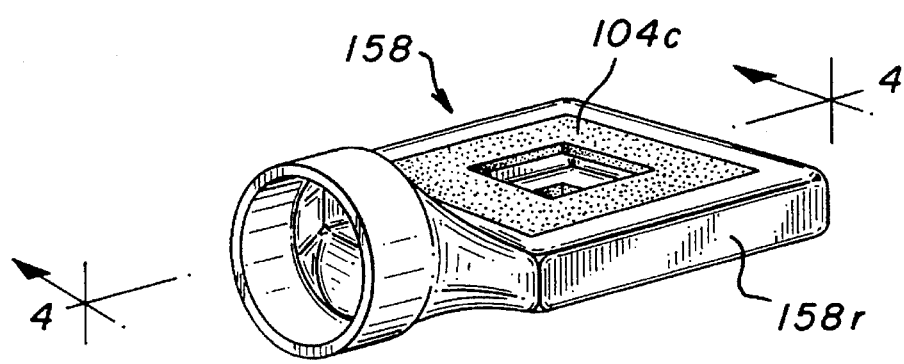
FIG. 2 is a clad part formed in accordance with the present invention from the composite blank of FIG. 1.
Figure 3:
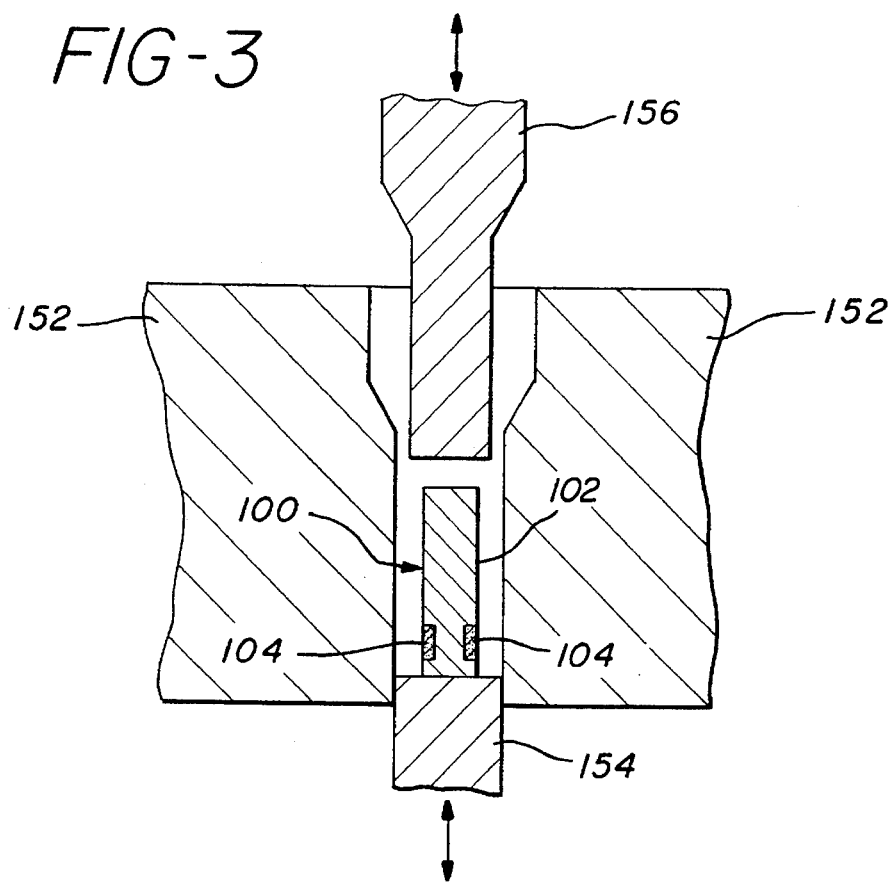
FIGS. 3 and 4 are cross sectional views of the composite blank of FIG. 1 and the clad part of FIG. 2 taken along the section lines 3—3 and 4—4, respectively, schematically illustrating the formation of the clad part from the composite blank.
Figure 4:
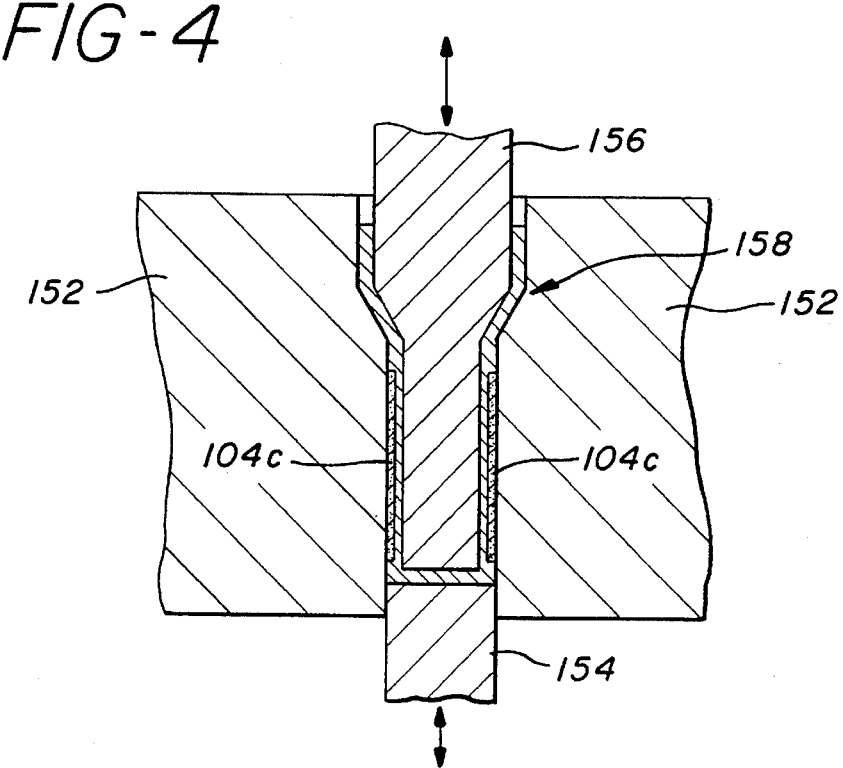

As can be seen in FIGS. 2 and 4, during this operation the clad material 104 forming part of the composite blank 100 forms an integral coating 104c on the sides of the fitting 158 (or top and bottom of the fitting 158 as shown in FIG. 2) in the proper locations for brazing the manifold fitting 158 into a manifold assembly.

For the manifold fitting 158 of FIG. 2, associated plates (not shown) are positioned on the top and bottom of the generally rectangular portion 158r and the assembly is heated to melt the integral coating 104c of clad material 104 to fuse the parts together. Openings in both sides of the generally rectangular portion 158r of the manifold fitting 158 for communicating the fitting with passageways in the associated plates is later formed by punch operation or other well known procedures which are not important to the present invention.

A second embodiment will now be described with reference to FIGS. 10–15 which illustrate use of a multielement blank of the present invention. FIGS. 10–12 illustrate generically formation of clad parts from two-part blanks. As shown in FIGS. 11 and 12, a two-part blank can be used to clad either at least a portion of an interior surface of a clad part or at least a portion of an exterior surface of a clad part. It is also noted that if both clad preforms are utilized to define a multielement blank having three parts, the resulting three-part blank can be used to clad at least a portion of an interior surface of a clad part and at least a portion of an exterior surface of a clad part.

While a simple rectangular part having a rectangular cavity formed therein is illustrated in FIGS. 11 and 12, it is apparent that a great variety of parts can be formed by shaping the die, punch and multielement blanks in correspondence with parts to be formed. With this understanding, the formation of the rectangular clad parts 160 and 162, shown respectively in FIGS. 11 and 12, from two-part blanks will now be described.

In FIG. 10, clad material, either a clad preform 164 or a clad preform 166, and base material, a blank preform 168, are inserted into a cavity 170 of a die 172. While the die 172 could be a two-part die which is operated or closed to forge a part from a two-part blank contained therein, in the illustrated embodiment a punch 174 is forced into the cavity 170 of the die 172.

If the clad preform 166 and the blank preform 168 are inserted into the cavity 170 of the die 172, the clad part 162 results from operation of the punch 174. As shown in FIG. 12, the clad part 162 has clad material 176 integrally coating its lower outside surface. The bottom 162b of the clad part 162, the upper portion 162u and a rectangular cavity 178 are not coated with clad material. The clad preform 166 and blank preform 168 are properly located within the die 172 for forging by the cavity 170.

If the clad preform 164 and the blank preform 168 are inserted into the cavity 170 of the die 172, the clad part 160 results from operation of the punch 174. As shown in FIG. 11, the clad part 160 has clad material 180 integrally coating the lower inside portion of its internal rectangular cavity 182 with the remainder of the clad part 160 not being coated with clad material. The blank preform 168 is properly located within the die 172 for forging by the cavity 170. The clad preform 164 is positioned by placement into the cavity 170, by a shallow indentation 168i shown in dotted lines on the blank preform 168, by structure (not shown) on the punch 174, by thin ribbed extensions (not shown) from the clad preform 168 or otherwise as will be apparent to those skilled in the art.

It should also be apparent that the blank preform 168 and both clad preforms 164 and 166 can be utilized as a three-part multielement blank. In that event, the result is a clad part which would be the combination or merging of the clad parts 160 and 162. Such a part would have clad material integrally coating its lower outside surface as in the clad part 162 and clad material integrally coating the lower inside portion of its internal rectangular cavity as in the clad part 160.

Figure 13:
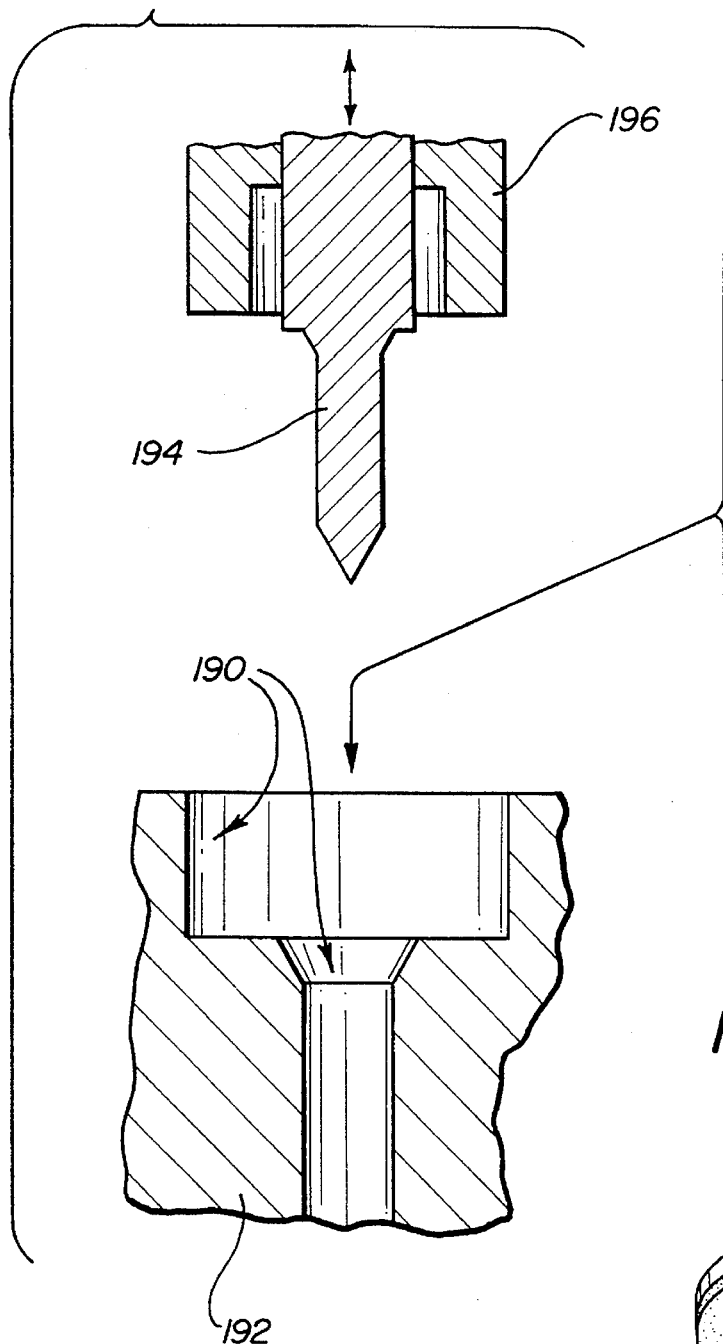
FIG. 13 is a schematic view of a punch an die utilizing a specific two-part multielement blank shown in FIG. 14 to make the clad part shown in FIG. 15.
Figure 14:
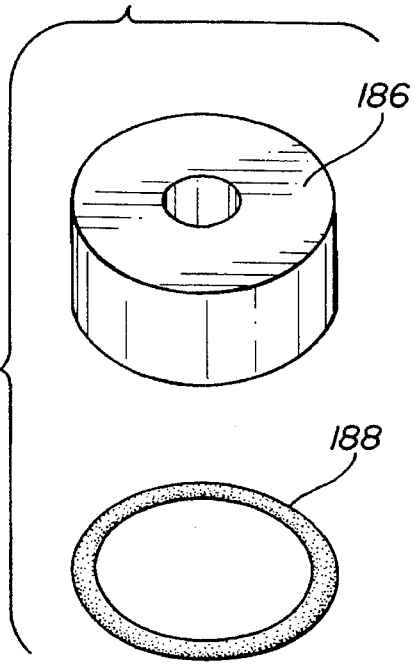
FIG. 14 is a perspective view of a two-part multielement blank used to form the clad part shown in FIG. 15.
Figure 15:
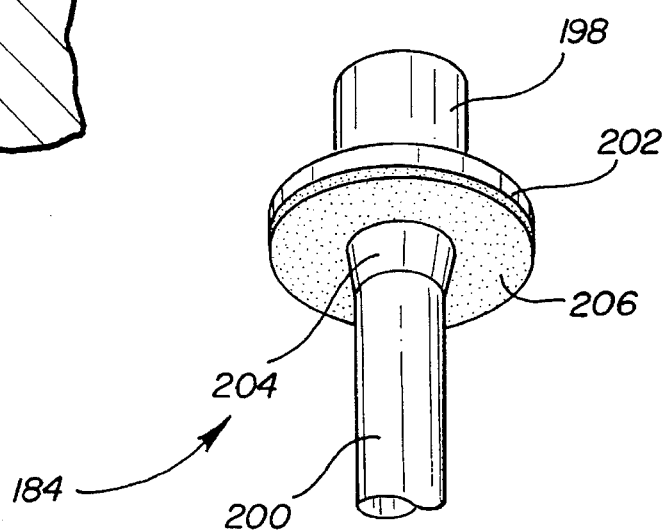
FIG. 15 is a perspective view of a clad part formed from the two-part multielement blank of FIG. 14 using the punch and die of FIG. 13.

While FIGS. 10–12 generically illustrate formation of clad parts using a two-part blank in accordance with the present invention, FIGS. 13–15 illustrate formation of a specific clad part, a connector tube 184 for use in a heat exchanger of an air conditioning system. As shown in FIG. 4 a two-part blank comprises a generally cylindrical or, more accurately, annular blank preform 186 formed, for example from aluminum, and a circular clad preform 188 formed, for example from an aluminum brazing alloy.

For production of the connector tube 184 shown in FIG. 15, the clad preform 188 is placed into a cavity 190 of a die 192. Next, the blank preform 186 is inserted into the cavity 190 on top of the clad preform 188. A punch 194 and surrounding sleeve 196 are next forced into the cavity 190 to form the connector tube 184 from the two-part blank comprising the blank preform 186 and the clad preform 188. The resulting structure includes an upper cylindrical extension 198 and a lower, more narrow cylindrical tube 200. The extension 198 is joined to the tube 200 by an annular flange 202 and a frustoconical extension 204. As shown in FIG. 15, the lower portion of the annular flange 202 is integrally coated by clad material 206 during the forging operation described. The connector tube 184 is used by having its tube 200 inserted into a receiving part to a point where the lower portion of the annular flange 202 rests against a matching surface. The parts are then heated to a temperature which melts the clad material 206 to fuse the connector tube to the receiving part.

Having thus described the methods and apparatus of the present invention in detail and by reference to preferred embodiments thereof, it will be apparent that modifications and variations are possible without departing from the scope of the invention defined in the appended claims.

What is claimed is:

1. A method for making a clad part having a portion clad with a brazing alloy for securing said part to another part, said method comprising the steps of:

forming a blank having a brazing alloy clad material affixed to form a first portion of an outer surface area of said blank, said first portion of said outer surface area of said blank comprising said brazing alloy material;

inserting said blank into a die; and inserting a punch into said die to forge said blank by substantially expanding said outer surface area of said blank including said first portion of said outer surface area of said blank to form said clad part to have an integral coating of said clad material on a first portion of an expanded outer surface area of said clad part, said first portion of the expanded outer surface area of said clad part being substantially larger than said first portion of the outer surface area of said blank.

2. A method for making a clad part as claimed in claim 1 wherein said step of forming a blank having clad material affixed to a first portion of an outer surface area of said blank comprises the steps of:

forming a blank having a recess therein;

forming clad material into a preform sized to be received and retained within said recess; and inserting said preform into said recess in said blank.

3. A method for making a clad part as claimed in claim 1 wherein said step of forming a blank having clad material affixed to a first portion of an outer surface area of said blank comprises the steps of:

forming a continuous strip of blank material having a slot extending into an outer surface area of said strip;

forming clad material into a strip sized to be received into said slot of said continuous strip of blank material;

forcing said strip of clad material into said slot of said continuous strip of blank material to form a composite strip; and cutting said blank from said composite strip.

4. A method for making a clad part as claimed in claim 1 wherein said step of forming a blank having clad material affixed to a first portion of an outer surface area of said blank comprises the steps of:

extruding a continuous strip of blank material having a slot extending into an outer surface area of said strip;

extruding a strip of clad material into said slot to form a composite strip; and cutting said blank from said composite strip.

5. A method for making a clad part as claimed in claim 1 wherein said step of forming a blank having clad material affixed to a first portion of an outer surface area of said blank comprises the steps of:

forming clad material into a tubular form;

forming a cylinder of blank material sized to be frictionally received within said tubular form of clad material; and inserting said cylinder of blank material into said tubular form of clad material.

6. A method for making a clad part as claimed in claim 1 wherein said step of forming a blank having clad material affixed to a first portion of an outer surface area of said blank comprises the steps of:

forming clad material into a tubular form;

forming a tubular base blank sized to be received within said tubular form; and fixing said tubular base blank within said tubular form.

7. A method for making a clad part as claimed in claim 1 wherein said blank is formed of aluminum and said brazing alloy clad material is an aluminum brazing alloy.

8. A method for making a clad part having a portion clad with a brazing alloy for securing said part to another part, said method comprising the steps of:

inserting a brazing alloy clad material and separate base material into a die, said brazing alloy clad material being sized to engage a first portion of a surface area of said separate base material; and inserting a punch into said die to form a clad part from said separate base material and said clad material by integrally coating said clad material on a first portion of a surface area of said clad part as said clad part is formed from said clad material and said separate base material, said surface area of said clad part and said first portion of said surface area of said clad part being substantially larger than said surface area of said separate base material and said first portion of said surface area of said separate base material, respectively.

9. A method for making a clad part as claimed in claim 8 further comprising the steps of:

forming said clad material into a preform corresponding to the clad part to be made; and forming said base material into a blank corresponding to the clad part to be made.

\* \* \* \* \*